(12) United States Patent
Stephens et al.

(10) Patent No.: US 10,719,383 B2
(45) Date of Patent: Jul. 21, 2020

(54) CONTINGENT LOAD SUPPRESSION

(71) Applicant: ARM LIMITED, Cambridge, Cambridgeshire (GB)

(72) Inventors: Nigel John Stephens, Cambridge (GB); Michael John Williams, Ely (GB); Richard Roy Grisenthwaite, Cambridge (GB)

(73) Assignee: ARM Limited, Cambridge (GB)

( * ) Notice: Subject to any disclaimer, the term of this patent is extended or adjusted under 35 U.S.C. 154(b) by 86 days.

(21) Appl. No.: 15/743,392

(22) PCT Filed: Jun. 21, 2016

(86) PCT No.: PCT/GB2016/051856
§ 371 (c)(1),
(2) Date: Jan. 10, 2018

(87) PCT Pub. No.: WO2017/021679
PCT Pub. Date: Feb. 9, 2017

(65) Prior Publication Data
US 2018/0203756 A1    Jul. 19, 2018

(30) Foreign Application Priority Data
Jul. 31, 2015 (GB) .................................. 1513508.0

(51) Int. Cl.
*G06F 11/00* (2006.01)
*G06F 11/07* (2006.01)
(Continued)

(52) U.S. Cl.
CPC ........ *G06F 11/079* (2013.01); *G06F 9/30036* (2013.01); *G06F 9/30043* (2013.01);
(Continued)

(58) Field of Classification Search
CPC .............. G06F 11/076; G06F 11/0763; G06F 11/0751; G06F 11/0766; G06F 11/0775;
(Continued)

(56) References Cited

U.S. PATENT DOCUMENTS 5,881,262 A    3/1999   Abramson et al.
2002/0147902 A1   10/2002   Kahn et al.
(Continued)

FOREIGN PATENT DOCUMENTS

WO    WO 2012/138952    10/2012

OTHER PUBLICATIONS

UK Examination Report dated Feb. 19, 2018 in GB 1513508.0, 3 pages.
(Continued)

*Primary Examiner* — Sarai E Butler
(74) *Attorney, Agent, or Firm* — Nixon & Vanderhye, P.C.

(57) ABSTRACT

A data processing system (2) supports non-speculative execution of vector load instructions that perform at least one contingent load of a data value. Fault detection circuitry (26) serves to detect whether a contingent load is fault-generating contingent load or a fault-free contingent load. Contingent load suppression circuitry (28) detects and suppresses a fault-free contingent load that matches a predetermined criteria that may result in an undesired change of architectural state (undesired side-effect). Examples of such predetermined criteria are that the contingent load is to a non-memory device or that the contingent load will trigger a diagnostic response such as entry of a halting debug halting mode or triggering of a debug exception.

13 Claims, 3 Drawing Sheets

Figure 1:
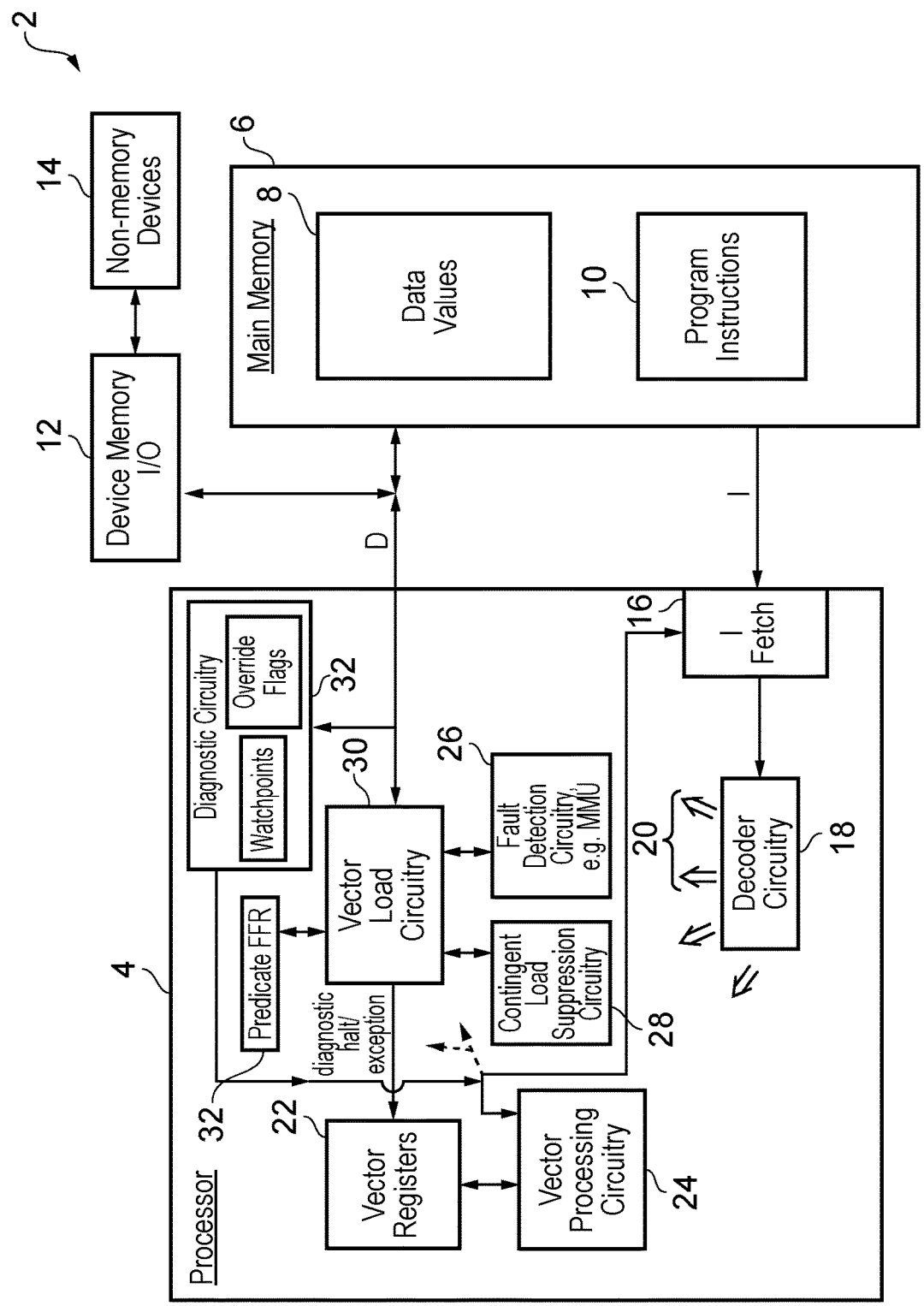

(51) Int. Cl.
*G06F 9/30* (2018.01)
*G06F 9/38* (2018.01)

(52) U.S. Cl.
CPC ........ *G06F 9/3865* (2013.01); *G06F 11/0721* (2013.01); *G06F 11/0751* (2013.01); *G06F 11/0793* (2013.01)

(58) Field of Classification Search
CPC ............. G06F 11/0772; G06F 11/0778; G06F 11/0781; G06F 11/22; G06F 2212/1008
USPC .......................................................... 714/49
See application file for complete search history.

(56) References Cited

U.S. PATENT DOCUMENTS

| | | | |
|---|---|---|---|
| 2003/0115509 A1* | 6/2003 | Dubal | G06F 11/2247 714/46 |
| 2006/0106499 A1* | 5/2006 | Roosli | G05B 9/02 700/276 |
| 2008/0177984 A1 | 7/2008 | Lataille et al. | |
| 2010/0325483 A1* | 12/2010 | Gonion | G06F 8/4441 714/10 |
| 2011/0047358 A1* | 2/2011 | Eichenberger | G06F 9/30018 712/222 |
| 2012/0254591 A1 | 10/2012 | Hughes et al. | |
| 2013/0047037 A1* | 2/2013 | Moyer | G06F 11/3656 714/38.1 |
| 2014/0068349 A1* | 3/2014 | Scott | G06F 11/3495 714/45 |
| 2014/0344553 A1 | 11/2014 | Hughes et al. | |
| 2015/0006855 A1* | 1/2015 | Gschwind | G06F 9/30145 712/207 |
| 2015/0100755 A1* | 4/2015 | Reid | G06F 15/78 712/7 |
| 2015/0121127 A1* | 4/2015 | Jain | G06F 11/1402 714/6.11 |
| 2016/0092398 A1* | 3/2016 | Gonion | G06F 9/30072 712/7 |

OTHER PUBLICATIONS

International Search Report and Written Opinion of the ISA for PCT/GB2016/051856, dated Sep. 9, 2016, 10 pages.
Combined Search and Examination Report for GB1513508.0, dated Feb. 22, 2016, 8 pages.
Official Letter of Pending Patent Application Under Examination, Taiwanese Patent Application No. 105122368 dated Mar. 31, 2020.

* cited by examiner

CONTINGENT LOAD SUPPRESSION

This application is the U.S. national phase of International Application No. PCT/GB2016/051856 filed 21 Jun. 2016, which designated the U.S. and claims priority to GB Patent Application No. 1513508.0 filed 31 Jul. 2015, the entire contents of each of which are hereby incorporated by reference.

This disclosure relates to the field of data processing systems. More particularly, this disclosure relates to data processing systems supporting vector load instructions that perform one or more contingent load operations.

It is known to provide data processing systems that support vector load instructions that load a plurality of vector elements from a memory into respective elements within a vector register.

At least some embodiments of the disclosure provide an apparatus for processing data comprising:

vector load circuitry responsive to non-speculative execution of a vector load instruction to perform at least one contingent load of a data value read from a memory address location of a memory to an element of a vector register;

fault detection circuitry to detect whether said contingent load is a fault-generating contingent load or a fault-free contingent load; and contingent load suppression circuitry to detect and suppress a fault-free contingent load that matches a predetermined criteria.

At least some embodiments of the disclosure provide apparatus for processing data comprising:

vector load means, responsive to non-speculative execution of a vector load instruction, for performing at least one contingent load of a data value read from a memory address location of a memory to an element of a vector register;

fault detection means for detecting whether said contingent load is a fault-generating contingent load or a fault-free contingent load; and contingent load suppression means, coupled to said vector load means and said fault detection means, for detecting and suppressing a fault-free contingent load that matches a predetermined criteria.

At least some embodiments of the disclosure provide a method of processing data comprising:

in response to non-speculative execution of a vector load instruction, performing at least one contingent load of a data value read from a memory address location of a memory to an element of a vector register;

detecting whether said contingent load is a fault-generating contingent load or a fault-free contingent load; and detecting and suppressing a fault-free contingent load that matches a predetermined criteria.

Figure 2:
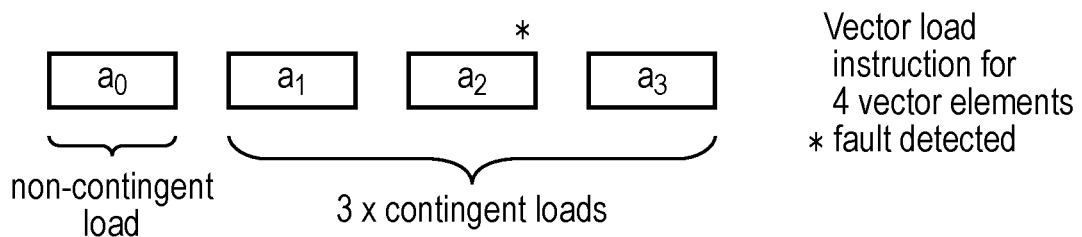
Figure 3:
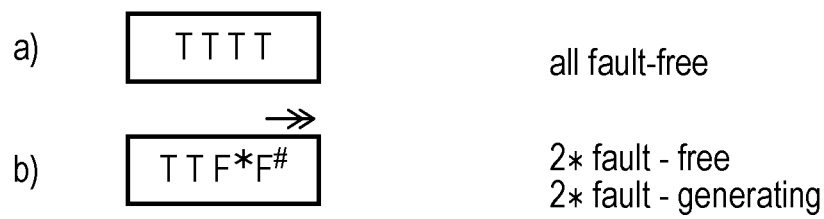
Figure 4:
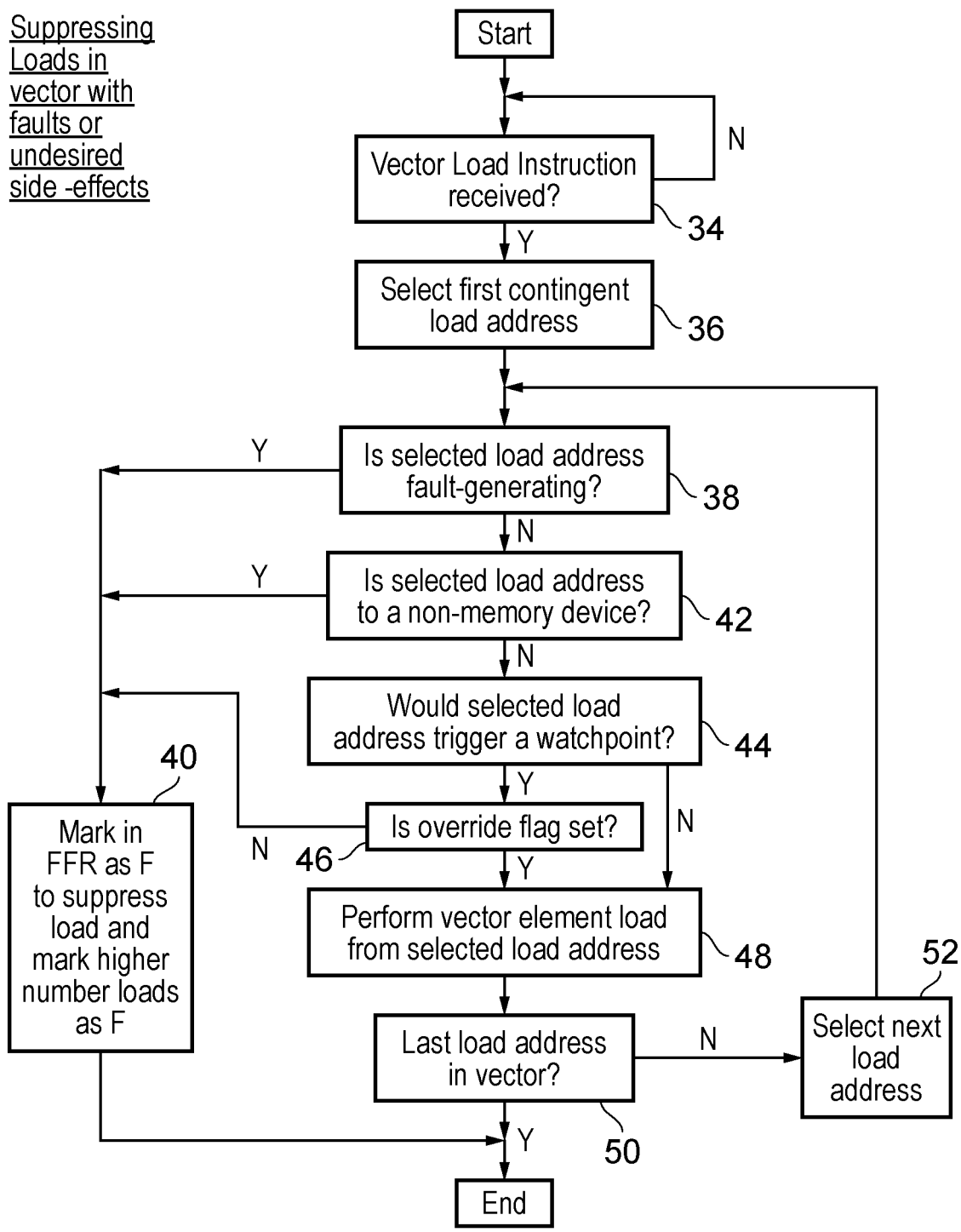

Example embodiments will now be described, by way of example only, with reference to the accompanying drawings in which:

FIG. 1 schematically illustrates a data processing system supporting vector load instructions controlled by fault detection circuitry and contingent load suppression circuitry;

FIG. 2 schematically illustrates a vector load instruction;

FIG. 3 schematically illustrates predicate values in the form of a first faulting register; and FIG. 4 is a flow diagram schematically illustrating suppression of contingent loads with faults or undesired side-effects.

FIG. 1 schematically illustrates a data processing system 2 including a processor 4 coupled to a main memory 6 storing both data values 8 to be manipulated and program instructions 10 for controlling operation of the processor 4. Also coupled to the processor 4 is a device memory input/output unit 12 for providing communication with non-memory devices 14 which are mapped to memory addresses within the memory address space of the system. The non-memory devices 14 may, for example, be devices such as keyboards, displays, sensors, actuators etc.

Program instructions are fetched from the main memory 6 by instruction fetch circuitry 16 and supplied to instruction decoder circuitry 18. The instruction decoder circuitry 18 generates control signals 20 which serve to control the other elements of the processor 4 to perform the processing operation specified by the decoded instructions. The processor 4 supports vector processing operations upon vector operands stored within vector registers 22 and performed by vector processing circuitry 24. A vector operand comprises a plurality of vector elements of a given size. Included within the instructions supported by the processor 4 are vector load instructions that may be non-speculatively executed to perform at least one contingent load of a data value fed from a memory address. Such vector load instruction is non-speculatively executed in the sense execution of the vector load instruction is explicit to the programming model and represents a change in the architectural state of the processor as expressed and observable to the programmer. A vector load instruction that is non-speculatively executed in this way may perform at least one contingent load of a data value, i.e. that load of a data value may or may not be performed dependant upon the conditions controlling the contingent behaviour of each of the element loads.

A primary determinate of whether or not such a contingent load that forms part of a vector load instruction is or is not performed is provided by the action of fault detection circuitry 26 which serves to detect whether or not a contingent load is fault-generating contingent load or a fault-free contingent load. A memory fault can arise for a number of reasons. Examples of such reasons are a permission fault, such as are policed by permission data within a memory management unit (MMU), and/or an address translation fault as provided by an address translation lookaside aside buffer. Memory access faults in respect of a non-contingent load triggers a memory exception, such as execution of a memory exception handling routine. In the case of a contingent load, the performance penalty of triggering such a memory fault may be unjustified as the data value loaded by that contingent load may not in fact be needed, e.g. the vector load instruction including the at least one contingent load may be fetching data which will not in practice be consumed. Fault-generating contingent loads may be suppressed by the fault detection circuitry 26 and not performed such that no memory fault response is necessary.

The processor 4 additionally includes contingent load suppression circuitry 28 which serves to detect and suppress fault-free contingent loads that match one or more predetermined criteria. Such fault-free contingent loads are ones which pass the fault detection as performed by the fault detection circuitry 26, but may nevertheless be desirable to suppress. One reason for suppressing fault-free contingent loads is that they may trigger an undesired change in the architectural (programmer visible) state of the data processing system 2 in an inappropriate manner as the data value loaded by the fault-free contingent load may not actually be required to be loaded in the original program flow. Thus, the fault detection circuitry 26 identifies fault-free contingent loads and the contingent load suppression circuitry 28 serves to suppress any such fault-free contingent load that match a predetermined criteria. Vector load circuitry 30 is accordingly controlled to non-speculatively execute a vector load instruction performing at least one contingent load of a data value 8 from the main memory 6 subject to any suppression of such contingent loads by the fault detection circuitry 26 or the contingent load suppression circuitry 28. A predicate first faulting register 32 serves to store a predicate value indicating which loads of a vector load instruction have and have not been performed as controlled by the fault detection circuitry 26 and the contingent load suppression circuitry 28.

The predetermined criteria detected by the contingent load suppression circuitry 28 in order to control whether or not a fault-free contingent load is suppressed can take a variety of different forms. One example form of such a predetermined criteria is that the fault-free contingent load is to an address allocated within the memory address space for communicating with the one or more non-memory devices 14 via the device memory input/output unit 12. Loads from non-memory devices 14 may trigger undesired changes in the state of the data processing system 2 which are inappropriate in respect of a contingent load which may not be required as part of the true program flow. As an example, a loop of program execution may be being followed with the vector load instruction being used to fetch ahead data values that are anticipated will be used within execution of the loop. However, such a loop may terminate before those data values are required and accordingly a contingent load of those data values may have triggered a change of the architectural state of the data processing system 2 which is inappropriate to the program flow that has actually been followed.

Another example of a predetermined criteria which may be detected by the contingent load suppression circuitry 28 is that a fault-free contingent load is to a memory address monitored as a watchpoint by diagnostic circuitry 32 such that the fault-free contingent load if performed will trigger a diagnostic operation. Such a diagnostic operation may, for example, include triggering a debug halt of execution or the taking of a diagnostic exception such that diagnostic exception processing is commenced. Both of these diagnostic responses are inappropriate if the fault-free contingent load is not part of the true program flow to be followed and accordingly such loads may be identified and suppressed by the contingent load suppression circuitry 28.

The Diagnostic circuitry 32 includes registers storing watchpoint addresses being monitored. User programmable diagnostic override flags (either global or on a per-watchpoint basis) may control the diagnostic circuitry and the contingent load suppression circuitry 28 to inhibit suppression by the contingent load suppression circuitry 28 of a contingent fault-free load that triggers a diagnostic operation. It may be in some circumstances that the behaviour of a system which needs to be investigated using the diagnostic circuitry 32 is associated with the execution of fault-free contingent loads and accordingly these should be permitted to give rise to diagnostic operations even though they are contingent in their nature and may not be part of the program flow as originally described by a programmer. The non-speculative execution of a vector load instruction to perform at least one contingent load of a data value from the main memory 6 serves to store the results of the contingent load into an element of a vector within the vector registers 22 and accordingly makes an architectural and programmable visible change to the state of the data processing system 2, i.e. the contents of the vector register that is the destination of the contingent load are updated with contingently loaded data value which may not actually be required/consumed as part of the program flow.

FIG. 2 schematically illustrates a vector load instructions for four vector elements $a_0$, $a_1$, $a_2$, $a_3$. The first vector element $a_0$ may be subject to a non-contingent load in that if the vector load instruction is being non-speculatively executed, then the program flow requires at least that first vector element $a_0$ to be loaded. The following three vector elements are subject to contingent vector loads of the type which may be suppressed by the fault detection circuitry 26 and the contingent load suppression circuitry 28. It will be appreciated that the non-contingent load of vector element $a_0$ could give rise to a fault, such as a permission fold, that would trigger a fault response and that such a fault response should be permitted to occur as it is a genuine part of the program flow being followed.

As illustrated in FIG. 2, the contingent loads which form part of the vector load have associated numbers. However, these numbers do not necessarily apply an actual ordering of the loads which are performed at a physical level by a particular implementation, rather they indicate the original order specified by the programmer.

FIG. 2 schematically illustrates a vector load instruction in which a first load is a non-contingent load. It is also possible to utilise the present techniques with vector load instructions where all of the loads of the loads of a vector load instruction are contingent loads.

FIG. 3 schematically illustrates the content of the predicate first faulting register 32 in response to non-speculative execution of a vector load instruction in two circumstances. In circumstance a), all of the vector element loads are fault-free and are not suppressed, and accordingly are all performed. This is indicated by four values of T (T and F may be represented by predetermine bit values of 0 and 1 respectively, or otherwise) within the predicate first faulting register 32. In the circumstance illustrated as b) in FIG. 3, the load of vector element $a_2$ as illustrated in FIG. 2 triggers a fault and accordingly is not performed and this is indicated by setting the corresponding element in the predicate first faulting register to F. This then suppresses the performing of any higher numbered vector element loads by the vector load instruction concerned which are also marked as fault-generating by setting the corresponding elements in the predicate first faulting register to F as a consequence of the existence of a lower numbered fault-generating load within the vector load instruction.

FIG. 4 is a flow diagram schematically illustrating the suppression of contingent loads in a vector load with either faults or undesired side-effects. Processing waits at step 34 until a vector load instruction is received. If the vector load instruction contains a first non-contingent load, then this handled by a separate mechanism to determine whether or not it should be performed (e.g. whether it is fault-free). Step 36 then selects the first contingent load address for testing. In the case of the vector load instruction illustrated in FIG. 2, this would be the address of the load to vector element $a_1$. Step 38 then determines whether or not the selected address is a fault-generating address, e.g. fails permission tests or fails translation. If the address is fault generating, then processing proceeds to step 40 where that address/load is marked as faulting within the predicate false faulting register 32 (initialised to all true values by a separate instruction before the load) with all subsequent higher numbered loads also being marked as faulting. The processing then ends. It will be appreciated that the operation of FIG. 4 illustrates how contingent loads may be detected and marked as faulting. In practice such a detection and marking may be performed at the same time as those loads are executed.

If the determination at step 38 is that the selected load address is not fault-generating, then processing proceeds to step 42 where a determination is made as to whether or not the load address is mapped to a non-memory device (a check as to whether to not the memory address corresponds to a memory mapped non-memory device). If the load address is to such a non-memory device, then processing again passes to step 40. If the determination at step 42 is that the selected load address is not to a non-memory device, then processing proceeds to step 44 where a determination is made as to whether or not the selected load address would trigger a watchpoint should the load be made. If the selected load address would trigger a watchpoint, then step 46 determines whether or not the override flag is set for such a watchpoint. The programmable diagnostic override flags may be set on a global basis with a single global flag applying to all of the watchpoints which are set, or on an individual basis with individual flags applying to respective individual watchpoints. Other arrangements with various mapping between override flags and respective watchpoints may also be provided if desired. If the determination at step 46 is that an override flag for the watchpoint that would be triggered is not set, then processing again proceeds to step 40.

If the determination at step 44 is that the load address would not trigger a watchpoint or the determination at step 46 is that an override flag for a potentially triggered watchpoint is set, then processing proceeds to step 48 where the vector element load is performed from the selected load address to the selected element of the vector register. Step 50 then determines whether or not the last load address within the vector load is the currently selected load address. If the last load address is not the currently selected address, then step 52 serves to select the next load address for testing and processing returns to step 38. If the currently selected address is the last load address, then processing terminates.

The above described example embodiments are ones in which the predetermined criteria are that a contingent load is to a non-memory device or that the contingent load will trigger a diagnostic operation, such a entering a halting debug mode or the triggering of a debug exception. It will be appreciated that the predetermined criteria which are detected by the contingent load suppression circuitry could take other forms. Such a predetermined criteria of other form may be indicative of a capability of that load to result in a change of state of the processor beyond the fault-free loading of the data value to the element of the vector register. The fault-free loading of the data value to the element within the vector register may result in a change of state which is not actually required by the program flow which is eventually followed, but it is one which is understood and expected within the programming model as a consequence of the non-speculative execution of the vector load instruction which performs one or more contingent loads of data values to such vector elements.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:
1. Apparatus for processing data comprising:
vector load circuitry responsive to non-speculative execution of a vector load instruction to perform at least one contingent load of a data value read from a memory address location of a memory to an element of a vector register;
fault detection circuitry to detect whether said contingent load is a fault-generating contingent load or a fault-free contingent load; and
contingent load suppression circuitry to detect and suppress a fault-free contingent load that matches a predetermined criteria.

2. Apparatus as claimed in claim 1, wherein said predetermined criteria is indicative of a capability to result in a change of state of said apparatus beyond fault-free loading of said data value to said element of said vector register.

3. Apparatus as claimed in claim 1, wherein said vector load circuitry is responsive to said vector load instruction to perform a plurality of loads comprising a non-contingent load and a plurality of contingent loads.

4. Apparatus as claimed in claim 3, wherein said non-contingent load is permitted to load a data value from a memory address independently of whether said non-contingent load has said predetermined criteria.

5. Apparatus as claimed in claim 1, wherein said vector load circuitry is responsive to said vector load instruction to perform a plurality of contingent loads.

6. Apparatus as claimed in claim 1, wherein said predetermined criteria is that said memory address of said fault-free contingent load is allocated for communicating with one or more non-memory devices.

7. Apparatus as claimed in claim 1, comprising diagnostic circuitry to perform a diagnostic operation and wherein said predetermined criteria is that said memory address of said fault-free contingent load matches an address set to trigger said diagnostic operation and suppression of said fault-free contingent load suppresses triggering of said diagnostic operation.

8. Apparatus as claimed in claim 7, wherein said address set to trigger said diagnostic operation is a diagnostic watchpoint address.

9. Apparatus as claimed in claim 7, wherein said diagnostic operation is one of: entering a halting debug mode; and triggering a debug exception.

10. Apparatus as claimed in claim 7, wherein said contingent load suppression circuitry is responsive to one or more user programmable diagnostic override flags to inhibit suppression by said contingent load suppression circuitry of said contingent fault-free load that triggers said diagnostic operation.

11. Apparatus as claimed in claim 10, wherein said one or more user programmable diagnostic override flags are set as one of: a global flag applying to each of a plurality of watchpoints; and a plurality of individual flags applying to respective individual watchpoints.

12. Apparatus for processing data comprising:
vector load means, responsive to non-speculative execution of a vector load instruction, for performing at least one contingent load of a data value read from a memory address location of a memory to an element of a vector register;
fault detection means for detecting whether said contingent load is a fault-generating contingent load or a fault-free contingent load; and
contingent load suppression means, coupled to said vector load means and said fault detection means, for detecting and suppressing a fault-free contingent load that matches a predetermined criteria.

13. A method of processing data comprising:
in response to non-speculative execution of a vector load instruction, performing at least one contingent load of a data value read from a memory address location of a memory to an element of a vector register;
detecting whether said contingent load is a fault-generating contingent load or a fault-free contingent load; and
detecting and suppressing a fault-free contingent load that matches a predetermined criteria.

* * * * *